US011974072B2

(12) United States Patent
Katakura (10) Patent No.: US 11,974,072 B2
(45) Date of Patent: Apr. 30, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Motoki Katakura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 420 days.

(21) Appl. No.: 17/179,940

(22) Filed: Feb. 19, 2021

(65) Prior Publication Data

US 2022/0053164 A1    Feb. 17, 2022

(30) Foreign Application Priority Data

Aug. 13, 2020 (JP) ................. 2020-136756

(51) Int. Cl.
  *H04N 7/14*   (2006.01)
  *H04M 3/56*   (2006.01)
(52) U.S. Cl.
  CPC ............ *H04N 7/142* (2013.01); *H04M 3/565* (2013.01); *H04M 3/567* (2013.01); *H04N 7/147* (2013.01)
(58) Field of Classification Search
  CPC ....... H04N 7/142; H04M 3/565; H04M 3/567
  See application file for complete search history.

(56) References Cited

U.S. PATENT DOCUMENTS

| 8,614,733 | B2 | 12/2013 | Kato |
| 2010/0186072 | A1* | 7/2010 | Kumar ................. H04L 9/3231 345/3.1 |
| 2011/0205331 | A1* | 8/2011 | Kato ................. H04N 21/4788 348/E7.083 |
| 2019/0268460 | A1* | 8/2019 | Agrawal ............... H04W 4/021 |
| 2020/0258053 | A1* | 8/2020 | Sakamoto ............... H04L 67/01 |

FOREIGN PATENT DOCUMENTS

| JP | H09-288645 A | 11/1997 |
| JP | 2005-215792 A | 8/2005 |
| JP | 2006-318173 A | 11/2006 |
| JP | 2011-199847 A | 10/2011 |

* cited by examiner

*Primary Examiner* — Amal S Zenati
(74) *Attorney, Agent, or Firm* — Oliff PLC (57) ABSTRACT

An information processing apparatus includes a memory; and a processor configured to, in a case where information on surroundings is acquired and transmitted to a terminal apparatus of a user at a remote place, perform control for disabling at least part of a function of transmitting information to the terminal apparatus of the user in a case where a current time is not included in a time window for which the user is scheduled to converse with another user in schedule of the user.

20 Claims, 7 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-136756 filed Aug. 13, 2020.

BACKGROUND

(i) Technical Field

The present disclosure relates to an information processing apparatus and a non-transitory computer readable medium.

(ii) Related Art

Japanese Unexamined Patent Application Publication No. 09-288645 discloses a system for preventing a sense of alienation, a sense of isolation, and a decline in sense of solidarity of each member by displaying, in a distributed individual office, a virtual large-room office made up of members.

Japanese Unexamined Patent Application Publication No. 2005-215792 discloses an electronic office service system that allows an employee to use all office works on an employee terminal given functions such as network transfer of telephone and FAX and a conference call.

Japanese Unexamined Patent Application Publication No. 2006-318173 discloses a security robot that switches between an at-home mode and an absent mode by using a switch and automatically controls household appliances in accordance with a mode to realize finely-tuned security effect and energy-saving effect.

Japanese Unexamined Patent Application Publication No. 2011-199847 discloses a conference system that restricts output of conference information of a partner of a conference on a user's terminal apparatus and notifies the partner about the restriction of the output by sending a message to the partner in a case where information of an instruction to restrict output of the conference information of the partner is input or in a case where it is determined that the output should be restricted based on sound recognition.

SUMMARY

Due to recent workstyle reforms, the number of people using a workstyle called teleworking such as working at home is increasing. In teleworking, in some cases, an information processing apparatus having a function of acquiring surrounding sound and a function of taking an image by a camera is provided at a position where a user working at home is present so that sound and an image are transmitted and received to and from a terminal apparatus of the user.

Aspects of non-limiting embodiments of the present disclosure relate to an information processing apparatus and a non-transitory computer readable medium that can prevent transmission of unnecessary information that should not be transmitted in a case where information such as sound and an image is transmitted or received to or from a user at a remote place.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a memory; and a processor configured to, in a case where information on surroundings is acquired and transmitted to a terminal apparatus of a user at a remote place, perform control for disabling at least part of a function of transmitting information to the terminal apparatus of the user in a case where a current time is not included in a time window for which the user is scheduled to converse with another user in schedule of the user.

BRIEF DESCRIPTION OF THE DRAWINGS

An exemplary embodiment of the present disclosure will be described in detail based on the following figures, wherein.

DETAILED DESCRIPTION

Next, an exemplary embodiment of the present disclosure is described in detail below with reference to the drawings.

Figure 1:
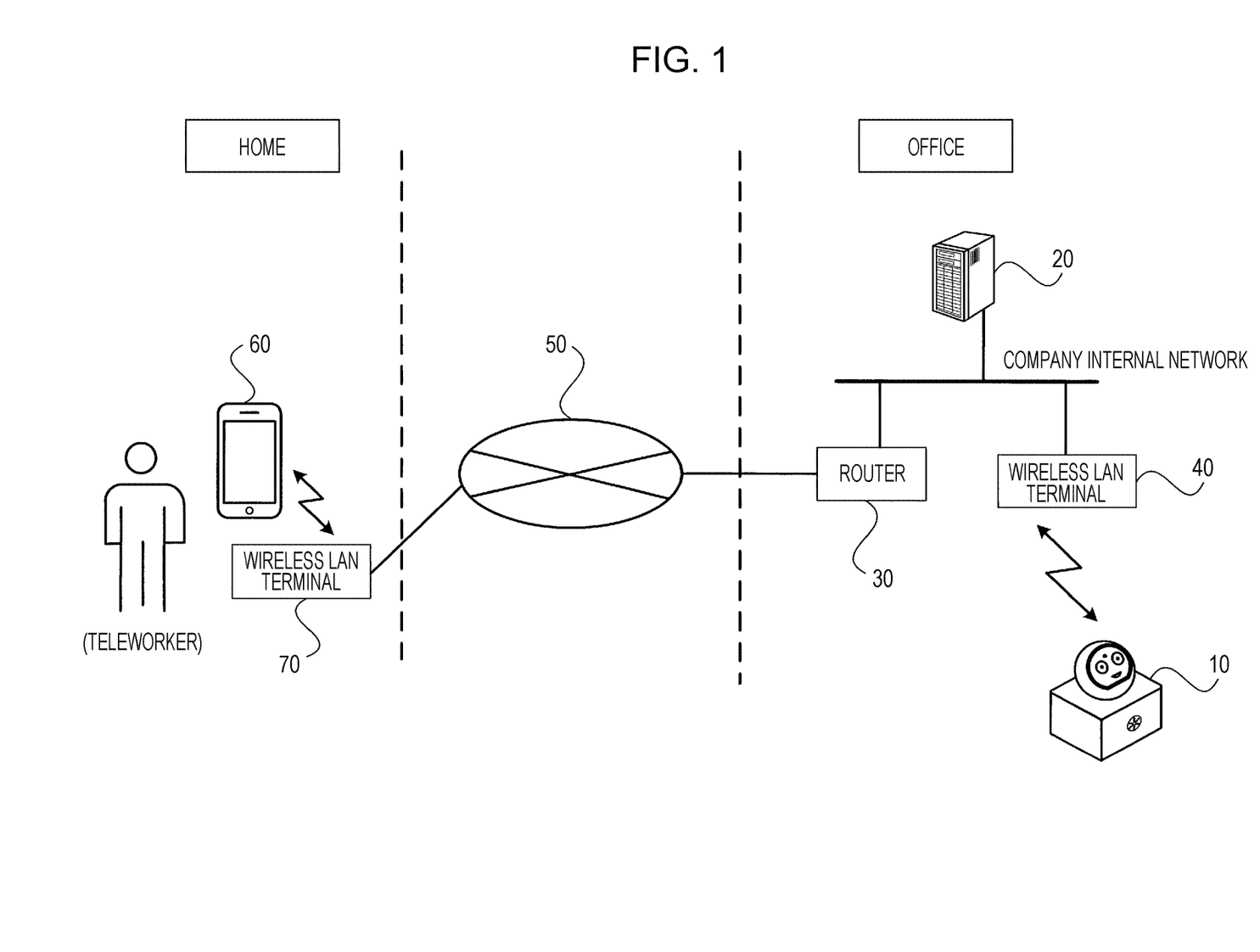
FIG. 1 illustrates a system configuration of a communication system according to an exemplary embodiment of the present disclosure.

FIG. 1 illustrates a system configuration of a communication system according to the exemplary embodiment of the present disclosure.

As illustrated in FIG. 1, the communication system according to the exemplary embodiment of the present disclosure is configured such that a terminal apparatus 60 of a teleworker working at home and a teleworker avatar device 10 used in an office are connected to each other through a wireless LAN terminal 70, the Internet 50, a router 30, a company internal network, and a wireless LAN terminal 40.

The teleworker avatar device 10 is a robot that expresses information on a teleworker working at a place (e.g., at home) remote from the office by using light, facial expressions, and the like. The teleworker avatar device 10 placed at the office instead of the teleworker can participate in a conference or a discussion and converse with other users in the office instead of the teleworker.

In a case where the teleworker is working at home, the teleworker avatar device 10, for example, emits green light to notify users around the teleworker avatar device 10 in the office that the teleworker is working at home.

That is, the teleworker avatar device 10 functions as an avatar, that is, as the other self of the teleworker at a remote place and thus realizes communication with other users in the office.

A schedule management server 20 for managing schedule information of users in the office including the teleworker is connected to the company internal network in the office.

Figure 2:
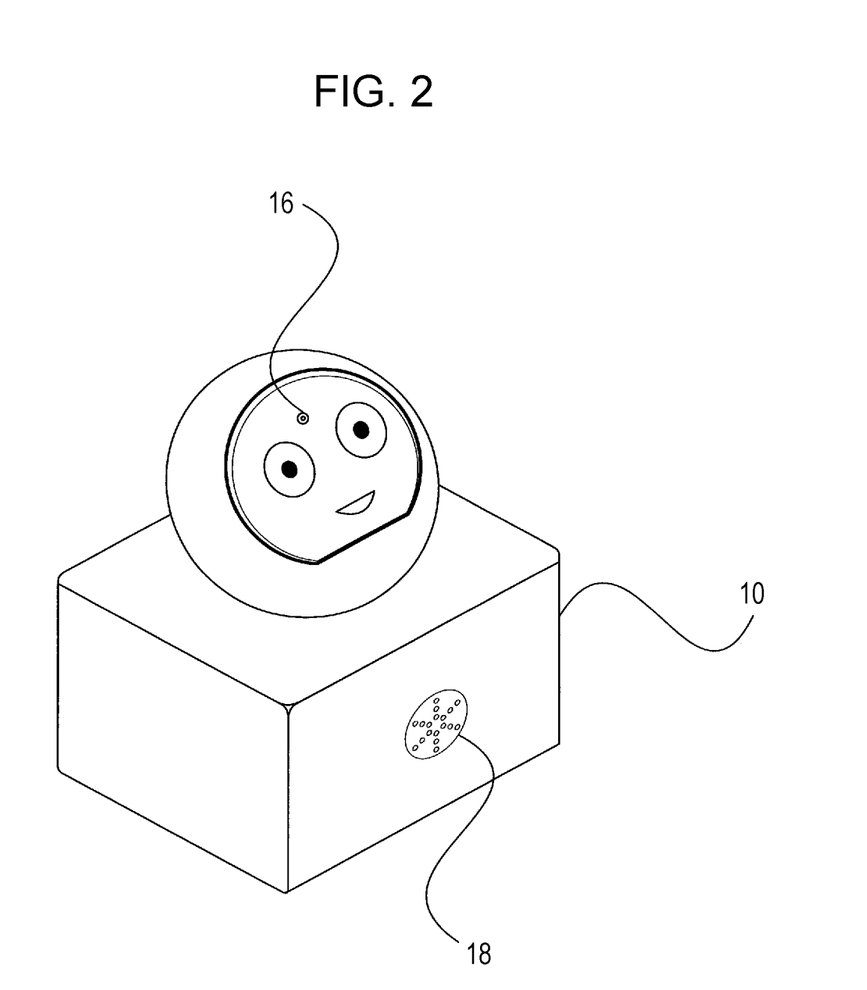
FIG. 2 illustrates an outer configuration of a teleworker avatar device illustrated in FIG. 1.

FIG. 2 illustrates an outer configuration of the teleworker avatar device 10. As illustrated in FIG. 2, the teleworker avatar device 10 has outer appearance such that a sphere imitating a human face is put on a box-shaped base in which a power source such as a battery is stored. The teleworker avatar device 10 includes a camera 16 for taking an image of surroundings and a speaker 18 for audio output.

Figure 3:
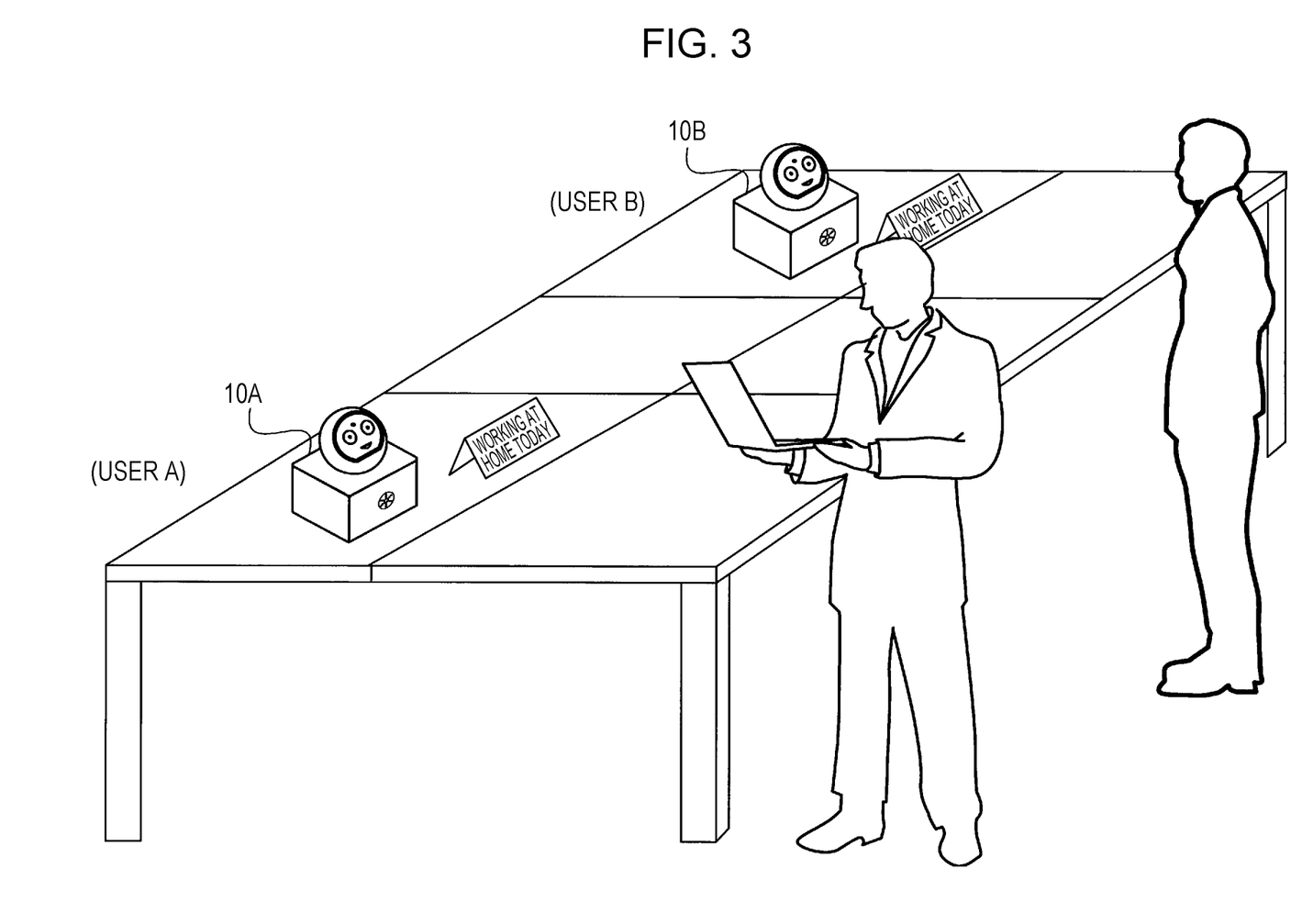
FIG. 3 is a view for explaining an example of use of the teleworker avatar device 10 in an office.

An example of use of the teleworker avatar device 10 in the office is described with reference to FIG. 3. For example, in FIG. 3, a teleworker avatar device 10A is connected to a terminal apparatus of a user A, and a teleworker avatar device 10B is connected to a terminal apparatus of a user B.

Other users actually working in the office can have a discussion or a conference with a teleworker working at home through the teleworker avatar device 10A or the teleworker avatar device 10B.

However, in a case where the teleworker avatar device 10 and the terminal apparatus 60 of a teleworker working at home are always connected, daily life noise which the worker at home makes, words which the worker at home speak to himself or herself, and sound which reveals how the worker at home is spending at home undesirably reach the teleworker avatar device 10 in the office.

The teleworker avatar device is connected to the Internet 50, for example, through wireless communication using a Wi-Fi (Registered Trademark) line and holds a power source such as a battery therein and is therefore portable. Therefore, in a case where a conference in which a teleworker also participates is held in another room such as a conference room, another user participating in the conference can bring the teleworker avatar device 10 to the conference room, and the teleworker can participate in the conference.

In such a case, the user who transports the teleworker avatar device 10 may sometimes leave the teleworker avatar device 10 behind somewhere or place the teleworker avatar device 10 in a place where a conference in which the user of the teleworker avatar device 10 should not participate is held. Furthermore, the teleworker avatar device 10 may be sometimes left behind in a conference room after the end of a conference in which the user of the teleworker avatar device 10 participated.

In such cases, sound information and image information that should not be transmitted to the teleworker are transmitted to the terminal apparatus 60 of the teleworker.

As described above, in a case where the teleworker avatar device 10 is always powered on and is always connected to the terminal apparatus 60 of the teleworker so that surrounding sound and images are always transmitted to the terminal apparatus 60 of the person working at home, unnecessary information that should not be transmitted is transmitted.

One measure for addressing such a problem is to provide the teleworker avatar device 10 with a switch for stopping transmission of sound and taking of images and to stop transmission of sound and taking of images by operating the switch in a case where sound and image information should not be transmitted.

However, as the number of teleworker avatar devices 10 increases, it becomes troublesome to operate the switch of each of the teleworker avatar devices 10, and a user sometimes forgets to turn off or on the switch. In particular, in a case where participants vary from one conference to another, it is necessary to specify who will participate in a conference and turn on or off the switches of the teleworker avatar devices 10 every time a conference is held. This is troublesome.

In view of this, the teleworker avatar device 10 according to the present exemplary embodiment is controlled as described below so that transmission of unnecessary information that should not be transmitted is prevented in a case where information such as sound and an image is transmitted and received to and from a teleworker at a remote place.

Figure 4:
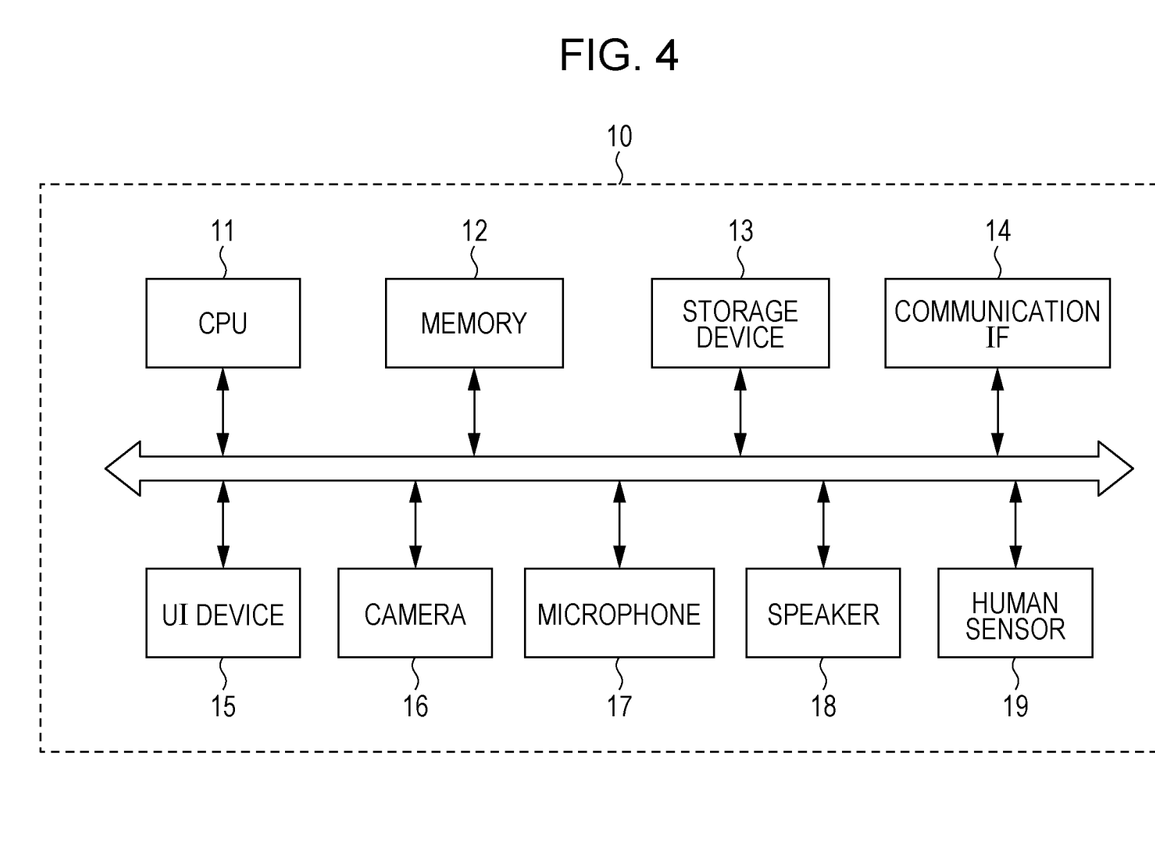
FIG. 4 is a block diagram illustrating a hardware configuration of the teleworker avatar device according to the exemplary embodiment of the present disclosure.

Next, FIG. 4 illustrates a hardware configuration of the teleworker avatar device 10 in an image forming system according to the present exemplary embodiment.

As illustrated in FIG. 4, the teleworker avatar device 10 includes a CPU 11, a memory 12, a storage device 13 such as a hard disk drive, a communication interface (abbreviated as IF) 14 that transmits and receives data to and from an external device or the like over a network, a user interface (abbreviated as UI) device 15 that notifies surrounding users about a state of a teleworker, a camera 16, a microphone 17, a speaker 18, and a human sensor 19. These constituent elements are connected to one another through a control bus.

The CPU 11 is a processor that controls operation of the teleworker avatar device 10 by performing predetermined processing on the basis of a control program stored in the memory 12 or the storage device 13. Although the CPU 11 reads out a control program stored in the memory 12 or the storage device 13 and executes the control program in the present exemplary embodiment, a program stored in a recording medium such as a CD-ROM may be offered to the CPU 11.

Figure 5:
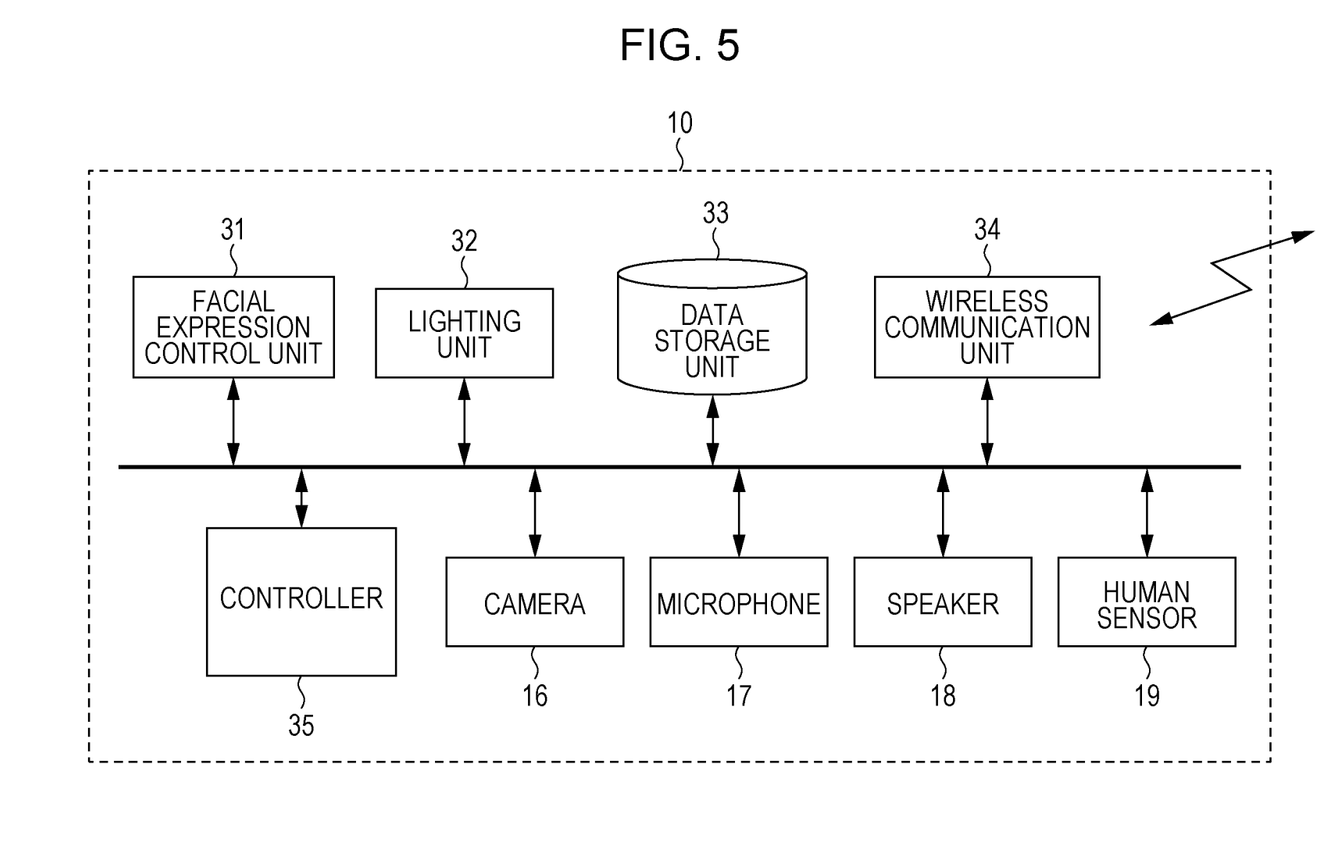
FIG. 5 is a block diagram illustrating a functional configuration of the teleworker avatar device according to the exemplary embodiment of the present disclosure.

FIG. 5 is a block diagram illustrating a functional configuration of the teleworker avatar device 10 realized by execution of the control program.

As illustrated in FIG. 5, the teleworker avatar device 10 according to the present exemplary embodiment includes a facial expression control unit 31, a lighting unit 32, a data storage unit 33, a wireless communication unit 34, a controller 35, and the camera 16, the microphone 17, the speaker 18, and the human sensor 19.

The facial expression control unit 31 controls facial expression of a part of the teleworker avatar device 10 that imitates a human face. The lighting unit 32 emits light of a preset color according to a state such as working at home under control of the controller 35.

The data storage unit 33 stores therein various data used for control of the controller 35.

The wireless communication unit 34 transmits and receives data to and from the wireless LAN terminal 40, for example, through a close-range wireless communication line such as Wi-Fi (Registered Trademark).

The camera 16 functions as an imaging unit that takes an image of surroundings. The microphone 17 functions as a sound acquiring unit that acquires surrounding sound information. The speaker 18 functions as a sound output unit that outputs a sound signal transmitted from the terminal apparatus 60.

The controller 35 controls operation of the whole teleworker avatar device 10 and performs control for transmitting an image taken by the camera 16 and a sound signal acquired by the microphone 17 to the terminal apparatus 60 of the teleworker working at home over the Internet 50 and outputting, from the speaker 18, a sound signal transmitted from the terminal apparatus 60.

The human sensor 19 is a human detector for detecting whether or not at least one person is around the teleworker avatar device 10 by using, for example, infrared light.

In a case where various kinds of information such as surrounding sound information and image information are acquired and transmitted to the terminal apparatus 60 of a teleworker at a remote place, the controller 35 performs control for disabling at least part of a function of a member such as the camera 16 or the microphone 17 that transmits information to the terminal apparatus 60 of the teleworker in a case where a current time is not included in a time window for which the teleworker is scheduled to converse with other users in schedule of the teleworker.

The time window for which the teleworker is scheduled to converse with other users means for example, a time window for which a conference, a discussion, a meeting, or the like is scheduled in which the teleworker needs to verbally communicate with other users.

Note that the controller 35 accesses the schedule management server 20 over the company internal network, acquires schedule information of this teleworker, and grasps schedule of the teleworker based on the acquired schedule information.

Figure 6:
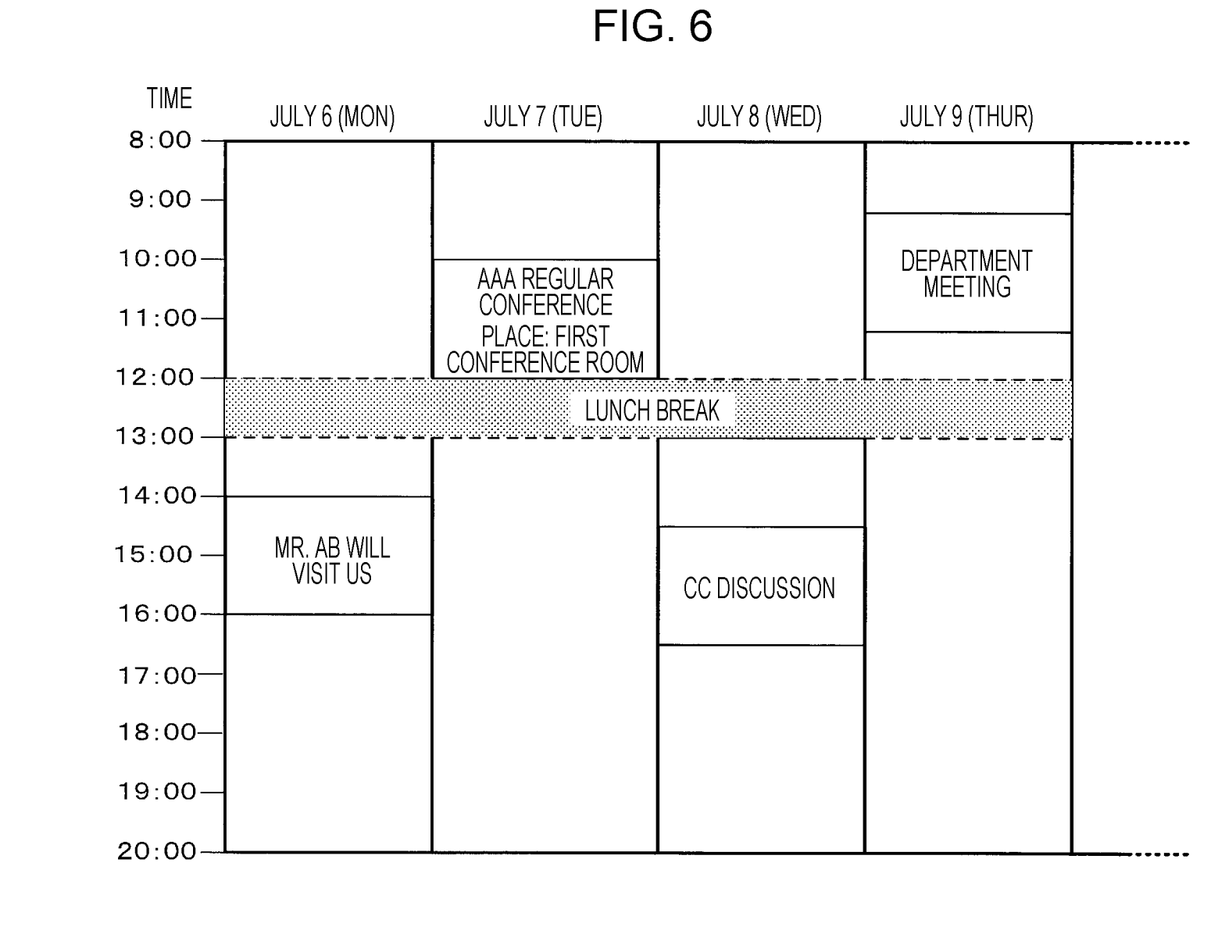
FIG. 6 illustrates an example of schedule information acquired from a schedule management server by a controller.

FIG. 6 illustrates an example of the schedule information acquired from the schedule management server 20 by the controller 35.

By referring to the schedule information illustrated in FIG. 6, time windows for which various conferences, discussions, meetings, and the like are scheduled are grasped. It can be determined whether or not a user is currently participating in a conference or the like by comparing a current time and the schedule information.

In a case where a current time is included in a time window for which a teleworker is scheduled to converse with other users in schedule of the teleworker, the controller 35 performs control for enabling the function of transmitting information to the terminal apparatus 60 of the teleworker.

Even in a case where a current time is included in a time window for which a teleworker is scheduled to converse with other users in schedule of the teleworker, the controller 35 performs control for disabling at least part of the function of transmitting information to the terminal apparatus 60 of the teleworker in a case where no user is detected around the teleworker avatar device 10 by the human sensor 19.

Specifically, in a case where a user who is transporting the teleworker avatar device 10, for example, to a conference room leaves the teleworker avatar device 10 behind, for example, in a washroom or on a washstand, unnecessary information is transmitted to the terminal apparatus 60 of the teleworker at a remote place if sound information and an image are acquired and transmitted to the terminal apparatus 60 even though there is no person around the teleworker avatar device 10.

In a conference or a discussion, in which other users are around the teleworker avatar device 10, there is no problem in acquiring and transmitting sound information and image information. However, if sound information and image information are acquired and transmitted in a situation where there is no person around the teleworker avatar device 10, even information that should not be transmitted is transmitted.

The controller 35 may perform control for disabling at least part of the function of transmitting information to the terminal apparatus 60 of a teleworker in a case where a position of the terminal apparatus 60 of the teleworker indicated by positional information acquired from the terminal apparatus 60 is not within a preset range.

For example, in a case where a teleworker brings the terminal apparatus 60 out from home, transmitting information in an office to this terminal apparatus 60 has a risk of leakage of the information in the office to a third party. If a teleworker goes out and leaves the terminal apparatus 60 behind somewhere, the risk of leakage of information in the office to a third party further increases. By registering a home of the teleworker as a preset range to prevent occurrence of such a situation, information is prevented from being transmitted to the terminal apparatus 60 in a case where the terminal apparatus 60 is at a place other than the home of the teleworker.

Furthermore, the controller 35 may perform control for disabling at least part of the function of transmitting information to the terminal apparatus 60 in a case where a teleworker is not detected around the terminal apparatus 60 of the teleworker.

This is because in a case where the teleworker is not detected around the terminal apparatus 60, the teleworker is away from the terminal apparatus 60 and is not prepared for a conference or the like. It is meaningless to transmit sound information and image information to the terminal apparatus 60 in such a case. Furthermore, unnecessary information may be undesirably leaked to a third party.

The controller 35 may perform control for disabling at least part of the function of transmitting sound information and image information to the terminal apparatus 60 of a teleworker in a case where a device such as earphones or headphones is not connected to an external sound output terminal of the terminal apparatus 60 of the teleworker.

The control for switching whether or not to transmit information on the basis of whether or not a device such as earphones or headphones is connected may be performed only in a case where the teleworker is located at a specific place. Specifically, in a case where the teleworker is at home, there is a low risk of leakage of information to a third party even in a case where a device such as earphones is not connected and sound is output from a speaker, and therefore sound information and the like may be transmitted to the terminal apparatus 60 even in a case where a device such as earphones is not connected to the external sound output terminal. Conversely, in a case where the teleworker is at a place other than home, information such as sound information is not transmitted to the terminal apparatus 60 since there is a risk of leakage of information to a third party if sound is output from the speaker.

Although the function of transmitting image information taken by a camera and the function of transmitting surrounding sound information acquired by a microphone are illustrated as the function of transmitting information to the terminal apparatus 60 of a teleworker in the present exemplary embodiment, whether or not to transmit information other than such sound information and image information to the terminal apparatus 60 may be controlled.

Next, operation of the teleworker avatar device 10 according to the present exemplary embodiment is described in detail with reference to the drawings.

Figure 7:
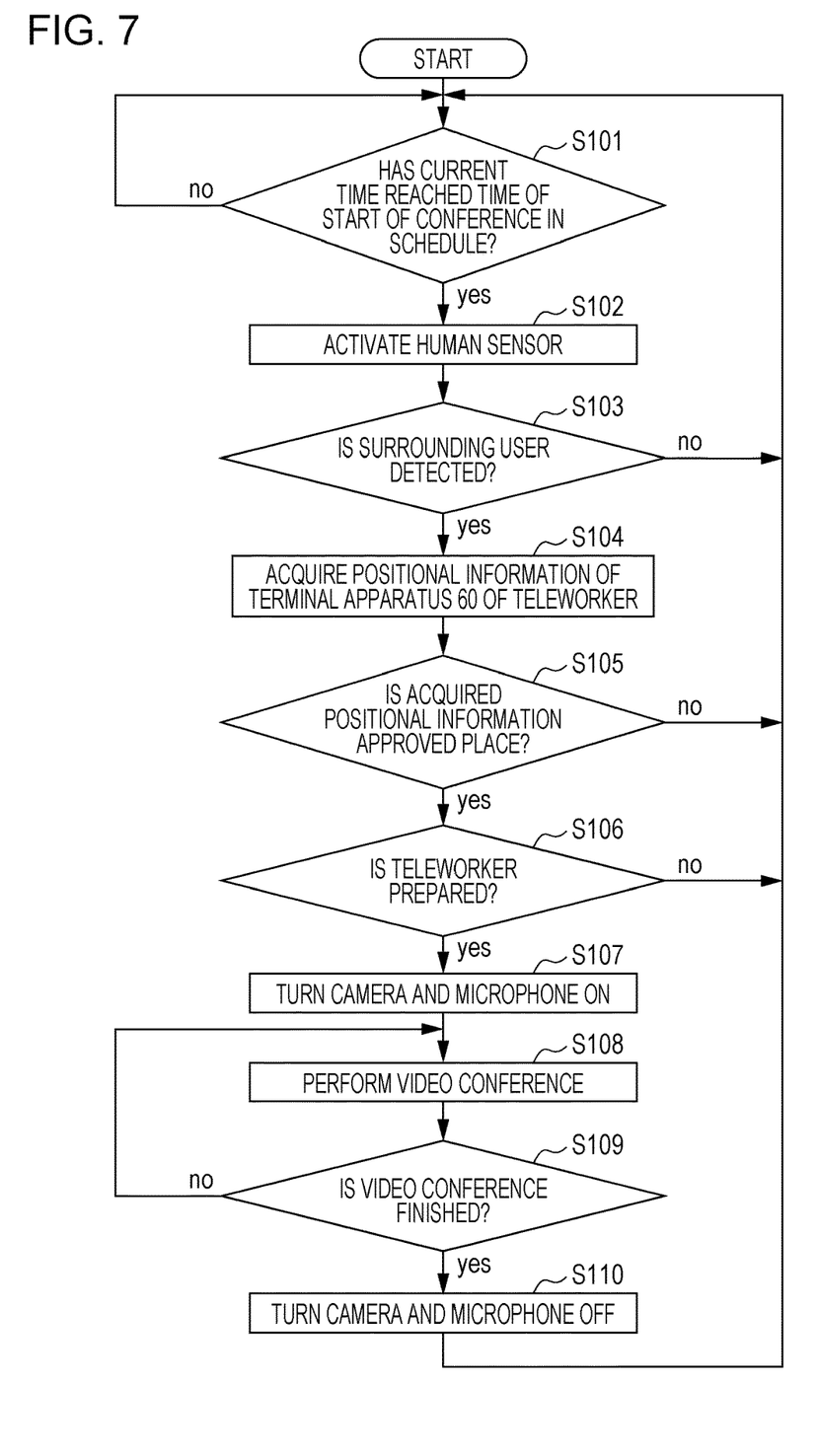
FIG. 7 is a flowchart illustrating operation of the teleworker avatar device according to the exemplary embodiment of the present disclosure.

FIG. 7 is a flowchart for explaining operation of the teleworker avatar device 10 according to the present exemplary embodiment.

In the following description, it is assumed that the teleworker avatar device 10 is always powered on and is always connected to the terminal apparatus 60 of a teleworker.

In such a state, in step S101, the controller 35 determines whether or not a current time has reached a time of start of a conference or the like in schedule of the teleworker on the basis of schedule information acquired from the schedule management server 20.

When the current time reaches a time window in which a conference or the like is scheduled to be held in the schedule information, the controller 35 activates the human sensor 19 to detect whether or not there is a user around the teleworker avatar device 10 in step S102.

In a case where a user is detected around the teleworker avatar device 10 by the human sensor 19 in step S103, the controller 35 acquires positional information of the terminal apparatus 60 of the teleworker in step S104.

In a case where it is determined in step S105 that the acquired positional information of the terminal apparatus 60 indicates a preset approved place such as a home of the teleworker, the controller 35 determines whether or not the teleworker is prepared in step S106.

Specifically, the controller 35 may determine whether or not the teleworker is prepared for the conference on the basis of whether or not the face of the teleworker can be detected by activating the camera of the terminal apparatus 60 or determine whether or not the teleworker is prepared for the conference on the basis of whether or not a device such as earphones is connected to the external sound output terminal of the terminal apparatus 60.

In a case where it is determined in step S106 that the teleworker is prepared for the conference, the controller 35 activates the functions of the camera 16 and the microphone 17 in step S107.

Then, in step S108, the controller 35 performs a video conference by transmitting and receiving sound information to and from the terminal apparatus 60 and transmitting and receiving an image taken by the camera 16 to the terminal apparatus 60 in step S108.

In a case where the current time is after an end time of the conference in the schedule, the controller 35 determines that the video conference has ended in step S109.

Then, in step S110, the controller 35 disables the functions of the camera 16 and the microphone 17.

The controller 35 proceeds to step S101 and shifts to a standby mode until a start time of a next conference or the like arrives. Also in a case where no user is detected in step S103, in a case where the positional information acquired in step S105 does not indicate the home of the teleworker, or in a case where it is determined in step S106 that the teleworker is not prepared, the controller 35 proceeds to step S101 and shifts to a standby mode until a start time of a next conference or the like arrives.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification

Although a case where the teleworker avatar device 10 is placed in an office and is connected to the terminal apparatus 60 of a teleworker has been described in the above exemplary embodiment, the present disclosure is not limited to this, and the present disclosure can also be applied even in a case where an information processing apparatus of various kinds such as a smartphone, a notebook computer, or a tablet terminal apparatus is connected to the terminal apparatus 60 of a teleworker.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory; and
   a processor configured to;
      acquire information on surroundings of the information processing apparatus;
      transmit the acquired information to a terminal apparatus of a user who is at a remote place from the information processing apparatus;
      determine whether a current time is included in a time window for which the user is scheduled to converse with another user in schedule of the user; and
      upon determining that the current time is not included in the time window, perform control for disabling at least part of a function of transmitting the acquired information to the terminal apparatus of the user who is at the remote place.

2. The information processing apparatus according to claim 1, wherein the processor is configured to
   upon determining that the current time is included in the time window, enable the function of transmitting the acquired information to the terminal apparatus of the user.

3. The information processing apparatus according to claim 2, wherein
   the processor is configured to, in a case where no user is detected around the information processing apparatus by a human detector, perform control for disabling at least part of the function of transmitting the acquired information to the terminal apparatus of the user even in a case where the current time is included in the time window for which the user is scheduled to converse with another user in the schedule of the user.

4. The information processing apparatus according to claim 1, wherein
   the processor is configured to perform control for disabling at least part of the function of transmitting the acquired information to the terminal apparatus of the user in a case where a position of the terminal apparatus of the user is not within a preset range.

5. The information processing apparatus according to claim 2, wherein
   the processor is configured to perform control for disabling at least part of the function of transmitting the acquired information to the terminal apparatus of the user in a case where a position of the terminal apparatus of the user is not within a preset range.

6. The information processing apparatus according to claim 3, wherein
the processor is configured to perform control for disabling at least part of the function of transmitting the acquired information to the terminal apparatus of the user in a case where a position of the terminal apparatus of the user is not within a preset range.

7. The information processing apparatus according to claim 1, wherein
the processor is configured to perform control for disabling at least part of the function of transmitting the acquired information to the terminal apparatus of the user in a case where no user is detected around the terminal apparatus of the user.

8. The information processing apparatus according to claim 2, wherein
the processor is configured to perform control for disabling at least part of the function of transmitting the acquired information to the terminal apparatus of the user in a case where no user is detected around the terminal apparatus of the user.

9. The information processing apparatus according to claim 3, wherein
the processor is configured to perform control for disabling at least part of the function of transmitting the acquired information to the terminal apparatus of the user in a case where no user is detected around the terminal apparatus of the user.

10. The information processing apparatus according to claim 4, wherein
the processor is configured to perform control for disabling at least part of the function of transmitting the acquired information to the terminal apparatus of the user in a case where no user is detected around the terminal apparatus of the user.

11. The information processing apparatus according to claim 5, wherein
the processor is configured to perform control for disabling at least part of the function of transmitting the acquired information to the terminal apparatus of the user in a case where no user is detected around the terminal apparatus of the user.

12. The information processing apparatus according to claim 6, wherein
the processor is configured to perform control for disabling at least part of the function of transmitting the acquired information to the terminal apparatus of the user in a case where no user is detected around the terminal apparatus of the user.

13. The information processing apparatus according to claim 1, wherein
the processor is configured to perform control for disabling at least part of the function of transmitting the acquired information to the terminal apparatus of the user in a case where no device is connected to an external sound output terminal of the terminal apparatus of the user.

14. The information processing apparatus according to claim 2, wherein
the processor is configured to perform control for disabling at least part of the function of transmitting the acquired information to the terminal apparatus of the user in a case where no device is connected to an external sound output terminal of the terminal apparatus of the user.

15. The information processing apparatus according to claim 3, wherein
the processor is configured to perform control for disabling at least part of the function of transmitting the acquired information to the terminal apparatus of the user in a case where no device is connected to an external sound output terminal of the terminal apparatus of the user.

16. The information processing apparatus according to claim 4, wherein
the processor is configured to perform control for disabling at least part of the function of transmitting the acquired information to the terminal apparatus of the user in a case where no device is connected to an external sound output terminal of the terminal apparatus of the user.

17. The information processing apparatus according to claim 5, wherein
the processor is configured to perform control for disabling at least part of the function of transmitting the acquired information to the terminal apparatus of the user in a case where no device is connected to an external sound output terminal of the terminal apparatus of the user.

18. The information processing apparatus according to claim 6, wherein
the processor is configured to perform control for disabling at least part of the function of transmitting the acquired information to the terminal apparatus of the user in a case where no device is connected to an external sound output terminal of the terminal apparatus of the user.

19. The information processing apparatus according to claim 1, wherein
the function of transmitting the acquired information to the terminal apparatus of the user is at least one of a function of transmitting image information taken by a camera of the information processing apparatus and a function of transmitting surrounding sound information acquired by a microphone of the information processing apparatus.

20. A non-transitory computer readable medium storing a program causing a computer to execute a process for information processing, the process comprising:
acquiring information on surroundings of the information processing apparatus;
transmitting the acquired information to a terminal apparatus of a user who is at a remote place from the information processing apparatus;
determining whether a current time is included in a time window for which the user is scheduled to converse with another user in schedule of the user; and
upon determining that the current time is not included in the time window, performing control for disabling at least part of a function of transmitting the acquired information to the terminal apparatus of the user who is at the remote place.

* * * * *